US012775088B2

(12) United States Patent
Tommaso et al.

(10) Patent No.: US 12,775,088 B2
(45) Date of Patent: Oct. 27, 2026

(54) MACHINE-LEARNING BASED OBJECT DETECTION AND LOCALIZATION USING ULTRASONIC SENSOR DATA

(71) Applicant: Robert Bosch GmbH, Stuttgart (DE)

(72) Inventors: Nesti Tommaso, Mountain View, CA (US); Boddana Santhosh, Parvathipuram manyam (IN); Yaman Burhaneddin, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 619 days.

(21) Appl. No.: 18/320,615

(22) Filed: May 19, 2023

(65) Prior Publication Data

US 2024/0385318 A1 Nov. 21, 2024

(51) Int. Cl.
*G01S 15/89* (2006.01)
*G01S 7/539* (2006.01)
*G01S 15/931* (2020.01)
*G06N 20/00* (2019.01)

(52) U.S. Cl.
CPC .............. *G01S 15/89* (2013.01); *G01S 7/539* (2013.01); *G01S 15/931* (2013.01); *G06N 20/00* (2019.01)

(58) Field of Classification Search
CPC ......... G06N 20/00; G01S 7/539; G01S 15/87; G01S 17/931
See application file for complete search history.

(56) References Cited

U.S. PATENT DOCUMENTS

| | | | | |
|---|---|---|---|---|
| 11,982,737 B1 * | 5/2024 | Liu | G01S 15/876 |
| 2012/0143357 A1 * | 6/2012 | Chemel | G01D 18/00 702/128 |
| 2020/0025917 A1 * | 1/2020 | Kozuki | G01S 15/89 |
| 2020/0088840 A1 * | 3/2020 | Stokes | G01S 13/937 |
| 2020/0334898 A1 * | 10/2020 | Bae | G06T 17/00 |
| 2022/0057498 A1 * | 2/2022 | Duval | G01S 15/42 |
| 2022/0080960 A1 * | 3/2022 | Hawes | G01S 15/08 |
| 2022/0096054 A1 * | 3/2022 | Vignon | G01S 7/52028 |
| 2023/0127044 A1 * | 4/2023 | Takagi | B60W 30/09 701/301 |
| 2024/0004056 A1 * | 1/2024 | Tapia | G01S 13/42 |
| 2024/0361841 A1 * | 10/2024 | Ni | G06F 3/017 |
| 2024/0385296 A1 * | 11/2024 | Akiyama | G01S 7/497 |

OTHER PUBLICATIONS

Rosique, Francisca, et al. "A systematic review of perception system and simulators for autonomous vehicles research." Sensors 19.3 (2019): 648.

Beltran, J. et al., "BirdNet: a 3D Object Detection Framework from LiDAR information," IEEE International Conference on Intelligent Transportation Systems 2018 (ITSC), May 3, 2018, 8 pages, DOI: 10.48550/arXiv.1805.01195.

(Continued)

*Primary Examiner* — Shelby A Turner
*Assistant Examiner* — Ibrahim Nagi Shohatee
(74) *Attorney, Agent, or Firm* — Brooks Kushman P.C.

(57) ABSTRACT

A novel ultrasonic-sensor based object detection framework, useful for autonomous vehicles, is disclosed. Disclosed embodiments input tabular ultrasonic data into a 3D point cloud. Multi-channel, bird's eye view data structures are obtained from the 3D point cloud. High quality, ultrasonic images are generated using a temporal-aggregation method and used as input to a machine-learning model.

20 Claims, 9 Drawing Sheets

(56) References Cited

OTHER PUBLICATIONS

Fayyad, J. et al., "Deep Learning Sensor Fusion for Autonomous Vehicle Perception and Localization: A Review," Sensors, vol. 20, No. 4220, Jul. 29, 2020, pp. 1-34, DOI: 10.3390/s20154220.
Liu, W. et al., "SSD: Single Shot MultiBox Detector," Computer Vision-ECCV 2016: 14th European Conference, Amsterdam, The Netherlands, Oct. 11-14, 2016, Proceedings, Part I, pp. 1-17 DOI: 10.1007/978-3-319-46448-0_2.
Marti, E. et al., "A Review of Sensor Technologies for Perception in Automated Driving," IEEE Intelligent Transportation Systems Magazine, vol. 11, No. 4, Sep. 2019, 14 pages, DOI: 10.1109/MITS.2019.2907630.

* cited by examiner

MACHINE-LEARNING BASED OBJECT DETECTION AND LOCALIZATION USING ULTRASONIC SENSOR DATA

TECHNICAL FIELD

The present disclosure relates to the use of machine-learning for object detection and localization. In some disclosed embodiments, ultrasonic sensors generate ultrasonic data that may be used to train a machine-learning model. In some disclosed embodiments, generated ultrasonic data may be input into a trained machine-learning model that may predict object detection and/or localization.

BACKGROUND

Detection and localization of obstacles and classifying them as drivable or not is critical for safe maneuverability of autonomous vehicles. Perception systems in autonomous vehicles have made significant advancements in recent years. Object detection is one of the most significant perception tasks for autonomous vehicles as the information from object detection is directly used for variety of fundamental tasks such as changing lanes, detecting traffic signals and road signs, and informing planning decisions. Such systems leverage different sensing modalities such as cameras, LiDARs, and Radars, and are powered by state-of-the-art deep learning algorithms. Thus, object-detection models that are robust and can adapt to change in the environment are needed for reliable deployment of autonomous vehicles. Rapid development of deep learning has enabled the development of advanced image-based object-detection models capable of handling changes in the environment such as varying light conditions or object orientation.

While there exist multiple sensors such as cameras, LiDARs, and Radars that may perform these tasks efficiently, such tasks may be challenging with automotive grade ultrasonic sensors. These challenges may be attributed to the nature of the ultrasonic sensing technology itself, including the lack of directionality information of the emitted echoes, the low sampling rate, the presence of signal noise, and the difficulty of combining echoes from multiple reflections.

SUMMARY

In recent years, object detection for perception tasks in autonomous vehicles has significantly progressed thanks to immense amount of research using camera sensor datasets. Cameras have been the mainstream sensor for developing various object detection models and these image-based object-detection models can generally work well. However, their performance degrades in cases where the scene is blocked by obstacles, such as may happen during foggy or snowy weather.

Recently, there has been a significant interest in developing LiDAR and Radar based object-detection models as each of these sensor technologies can tackle existing challenges in camera-based object-detection systems. The success of such object-detection models has led to development of fusion architectures that further enhance the accuracy of perception tasks in autonomous vehicles. Each of these sensors have advantages and disadvantages under different circumstances. Particularly, LiDAR works well with long range and different illumination conditions but suffers from adverse weather conditions and high costs. While Radar works well with varying ranges, illumination, and weather conditions, it suffers from low-resolution and near-range performance.

The data acquired from LiDAR sensors are three-dimensional ("3D") point clouds. Thus, 3D object-detection networks have been a natural choice for point-cloud based object detection. While initial works focused on manually crafted feature representations, more recent works have removed dependency on such hand-crafted features. These feature-learning oriented end-to-end trainable networks can be roughly categorized into two main categories, namely grid-based and point-based methods. Point-based methods directly process the features from raw point-cloud data without any transformation, while grid-based methods transform the point clouds into 3D voxels or a two-dimensional ("2D") bird's eye view. Point-based approaches have more computational cost but have higher accuracy due to direct processing of point clouds. Grid based approaches are computationally more efficient but suffer from information loss due to transformations.

Due to their relatively low cost and suitability for near range detection, there has been interest in using ultrasonic sensors for certain autonomous vehicle ("AV") applications. Averaging and majority voting-based distance estimation algorithms have been proposed for curb detection and localization. Capsule neural networks have been used for height classification. On one hand, ultrasonic sensors may perform well with near-range, low-speed, and varying illumination conditions, yet suffer from varying temperature and humidity due to sensing properties. On the other hand, a lack of research on ultrasonic sensors has hindered development for ultrasonic-based object detection. For example, there appears to be little or no research on machine-learning ("ML") based object detection using ultrasonic sensor data.

Thus, there exist multiple sensors such as cameras, LiDARs, and Radars that may perform perception tasks (e.g., detection and localization) efficiently, but such tasks may be challenging with automotive grade ultrasonic sensors. These challenges may be attributed to the nature of the ultrasonic sensing technology itself, including the lack of directionality information of the emitted echoes, the low sampling rate, the presence of signal noise, and the difficulty of combining echoes from multiple reflections. Ultrasonic sensors are a low-cost, durable, and robust sensing technology that is particularly suitable for near-range detection in harsh weather conditions but have received very limited attention in the perception literature.

The present disclosure describes extending, to ultrasonic sensors, approaches developed for other sensors. In some disclosed embodiments, a grid-based 2D bird's eye view ("BEV") transformation approach is adapted to ultrasonic data. In some disclosed embodiments, a one-stage, object-detection model may be leveraged to meet stringent time requirements in autonomous vehicles.

Given the resiliency and low-cost of ultrasonic sensors compared to other sensors, development of ultrasonic-based models can significantly contribute to the accuracy and safety of perception tasks for autonomous vehicles. Disclosed embodiments present object-detection systems and methods based on novel ultrasonic sensor technology. Disclosed embodiments may transform input data from ultrasonic sensors into ultrasonic-based BEV data structures (e.g., images) for training state-of-the-art object-detection models. Disclosed embodiments may enable accurate detection of objects in low-speed scenarios. In some embodiments, disclosed methods comprise: during each of a plurality of cycles, simultaneously emitting, according to a fixed pattern, an ultrasonic signal from one or more of a plurality of ultrasonic sensors embedded on a moving vehicle, wherein each emitted ultrasonic signal is received as an echo at one of the plurality of ultrasonic sensors; obtaining echo data corresponding to the received echoes, the echo data including, for each received echo, the sending sensor, the receiving sensor, a travel distance, and an amplitude; for each cycle, generating a three-dimensional ("3D"), point cloud representation of the generated echo data, the point cloud representation comprising 3D cells with each 3D cell including a center point of the cell, the number of echoes intersecting the 3D cell, and for each intersecting echo, an amplitude of the intersecting echo and an azimuth angle of the intersecting echo; for each cycle, projecting the 3D representation onto a two-dimensional ("2D") plane comprising 2D cells, each 2D cell corresponding to a plurality 3D cells of the point cloud representation, and each 2D cell encoding echo-intensity information, echo-amplitude information, and echo-azimuth-angle information derived from the corresponding one or more 3D cells.

In disclosed embodiments, information in the 2D plane described above may be used to train a machine-learning model to generate an object-detection model. In some disclosed embodiments, information in the 2D plane described above may be input into a trained machine-learning model to perform an object-detection task.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
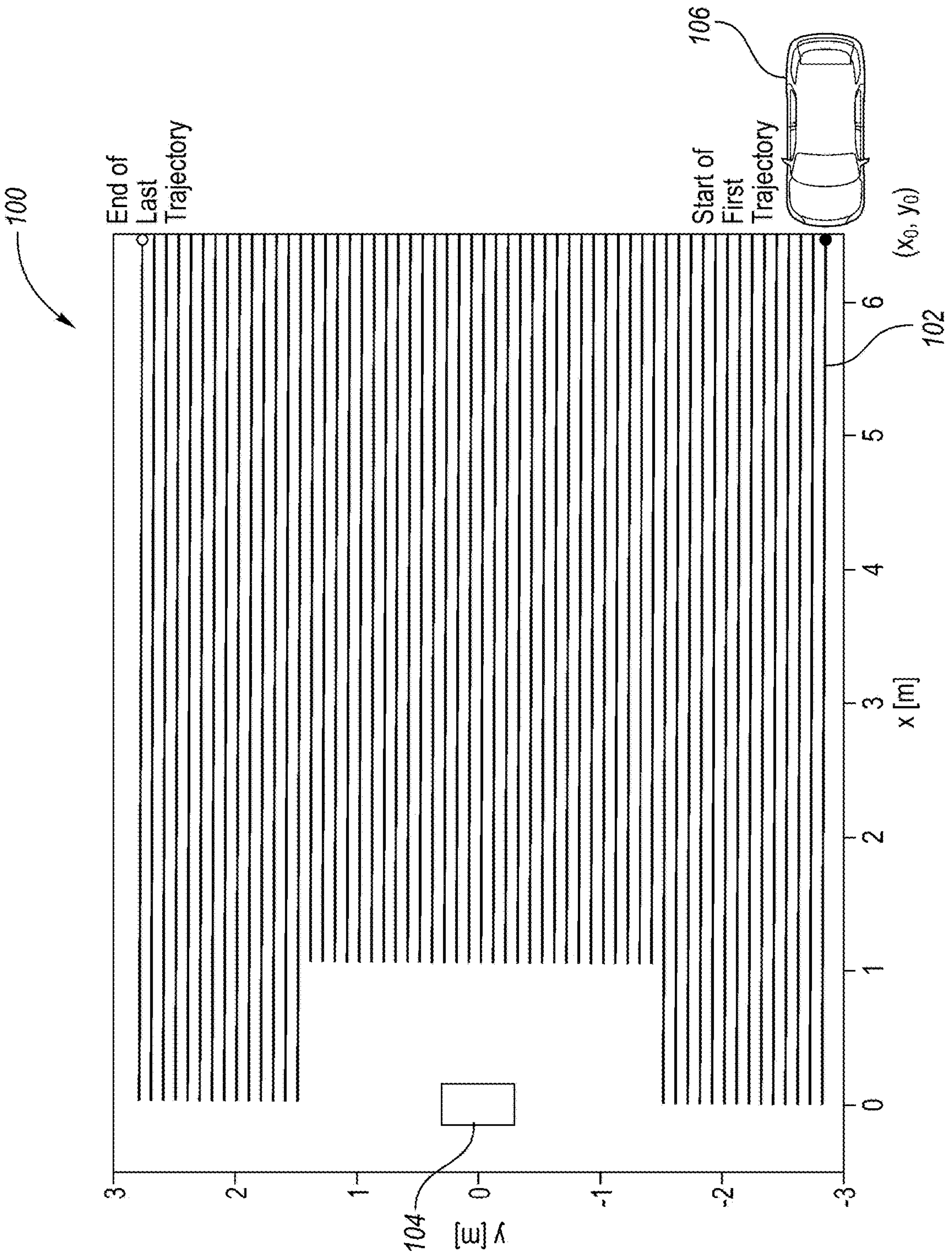
FIG. 1 illustrates a vehicle approach pattern useful for data collection in accordance with disclosed embodiments.

In disclosed embodiments, ultrasonic sensors may send out high-frequency sound waves to measure the distance to objects based on the measurement of the time of flight of the sonic wave from when it is emitted until the echo is received and may compare an object's echo amplitude against a threshold to detect an object. The ultrasonic data used in disclosed embodiments may be collected using multiple ultrasonic sensors. For example, a plurality of ultrasonic sensors may be embedded on a vehicle's front bumper. In some disclosed embodiments, twelve ultrasonic sensors may be arranged on a vehicle's front bumper in two parallel rows of six ultrasonic sensors. The vehicle (and bumper) may move in a measurement space where different objects, such as poles, child dummies, bicycles, and/or curbstones have been placed. FIG. 1 illustrates a measurement space 100 useful for data collection in accordance with disclosed embodiments. The vehicle 106 may follow a predetermined approach pattern 102 as in FIG. 1, for example. As the bumper moves and approaches the object 104, multiple sensors send out ultrasonic signals simultaneously according to a fixed pattern with each sending sensor corresponding to a unique receiving sensor receiving an echo of the signal. A set of such simultaneous signals and echoes received is called a cycle. For each echo in a cycle, the features of interest are the sender and receiver sensors, a travel distance of the echo, and an amplitude of the echo. Table 1 illustrates an example of data that may be collected in 2 cycles of ultrasonic measurements.

The usefulness of the ultrasonic data shown in Table 1 may be limited because it only includes the distance travelled by the echo, but not the direction of measurement and angle of incidence, thus providing only the set of potential reflection points of an echo, rather than exact (x, y, z) coordinates. The geometrical locus of potential reflection points is provided, which in the case of an echo with same sender and receiver s and measured distance d can be approximated by the surface area of a 3D spherical cone with center in s, radius d, and cone angle dictated by the Field-of-View of the sensors. In the case of an echo with different sender s and receiver r, the sphere is replaced by a 3D ellipsoid of revolution with sender and receiver sensors located at the focal points, with the major semi-axis being equal to d, the minor semi-axis uniquely determined by the sensors' coordinates, and the rotational symmetry being about the semi-axis of length d.

TABLE 1

| Time | Cycle | Echo | Sender | Receiver | Distance | Amplitude |
|---|---|---|---|---|---|---|
| $t_1$ | $c_1$ | $e_{11}$ | $s_{11}$ | $r_{11}$ | $d_{11}$ | $a_{11}$ |
| | | $e_{12}$ | $s_{12}$ | $r_{12}$ | $d_{12}$ | $a_{12}$ |
| $t_2$ | $c_2$ | $e_{21}$ | $s_{21}$ | $r_{21}$ | $d_{21}$ | $a_{21}$ |

This limitation is in contrast with the LiDAR data format, which is directly available as high-resolution 3D point clouds with exact (x, y, z) coordinates. This difficulty makes the development of ultrasonic-based object-detection algorithms significantly harder compared to camera and LiDAR and can help explain the very limited research on integrating ultrasonic technology in sensor fusion perception, with most ultrasonic-sensor applications in autonomous driving being limited to parking assistance use cases. However, ultrasonic sensors are particularly relevant for ultra-near range detection and can complement other sensors by covering blind spots and providing necessary redundancy in case of adverse weather conditions. Disclosed embodiments circumvent this limitation to obtain point-cloud-like input for ultrasonic applications.

Disclosed embodiments may include data structures that may enable the use of established deep learning architectures to perform object localization, bridging the gap between ultrasonic sensors and more expensive sensors. Disclosed embodiments may generate a 2D data structure from ultrasonic sensor data. The 2D data structure may be referred to as a BEV. In some disclosed embodiments, a 2D data structure is generated that may represent a 3D point-cloud representation of ultrasonic data.

Figure 2:
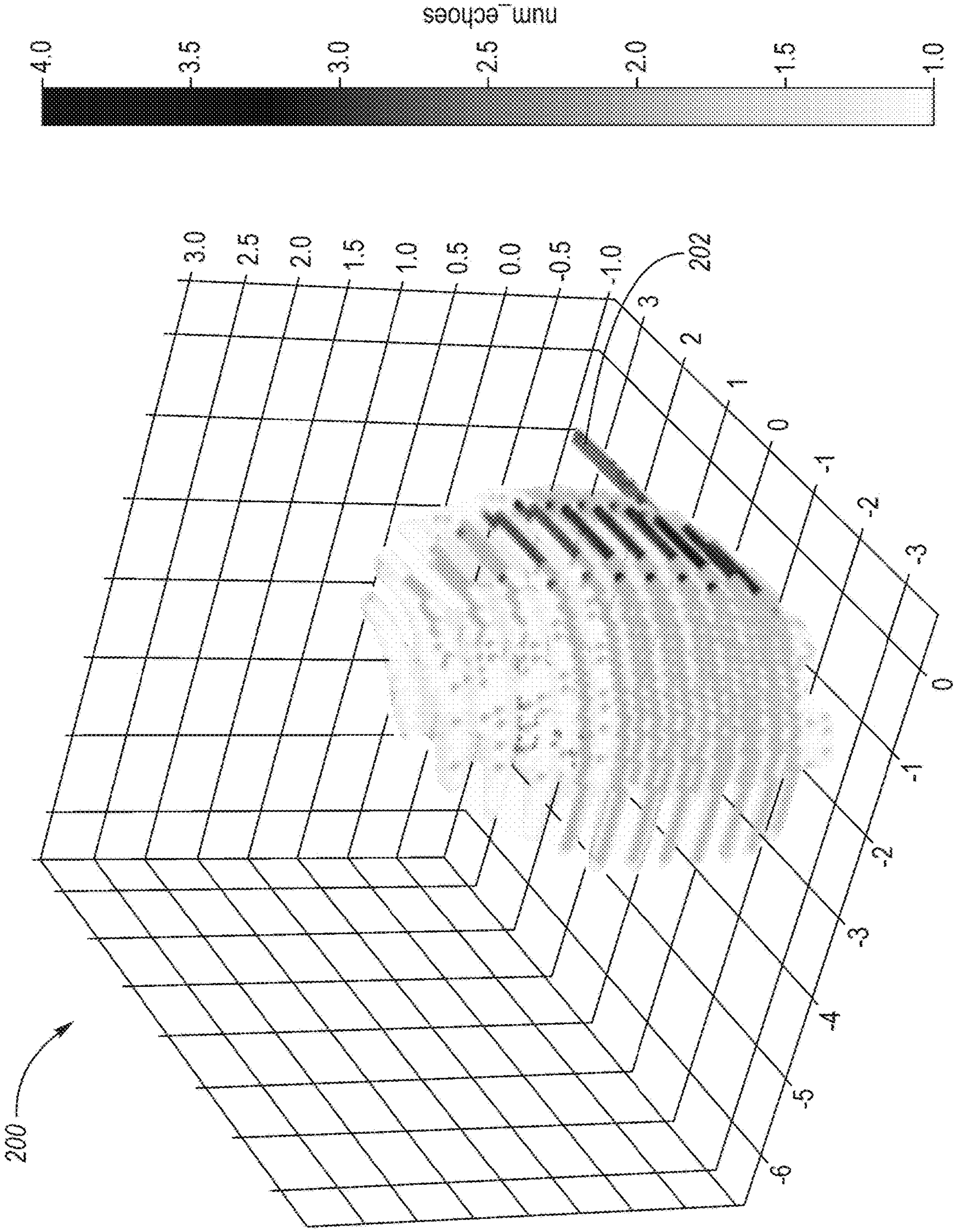
FIG. 2 illustrates an example of a voxelized 3D point cloud in accordance with disclosed embodiments.

FIG. 2 illustrates an example of a voxelized 3D point cloud 200 according to disclosed embodiments. The 3D point cloud 200 illustrated in FIG. 2 corresponds to a cycle with 4 echoes. Points refer to the centers of the 3D voxels. The 3D voxels in FIG. 2 are shaded based on the number of echoes in a voxel with a darker shade indicating a larger number of echoes than a lighter shade. A 3D voxel may also be referred to herein as a 3D cell. Higher-intensity voxels cluster around the location of an object, such as the object 104 in FIG. 1 or 202 in FIG. 2.

Given an echo, the set of reflection points is a portion of the surface of a sphere as explained above. In disclosed embodiments, a 3D Euclidean space is discretized into a 3D grid with a predetermined voxel size. This predetermined size of voxel may be chosen based on a trade-off analysis between resolution and computational cost. In some disclosed embodiments, a voxel size of 5 cm by 5 cm by 20 cm is used. The discretization of the sphere into a 3D grid may be based on its intersections with the voxels. Each 3D grid cell may be seen as a point in a discrete voxelized 3D point cloud, where each point contains the coordinates of the cell's center, as well as information relating to the echoes intersecting the 3D grid cell.

Figure 3:
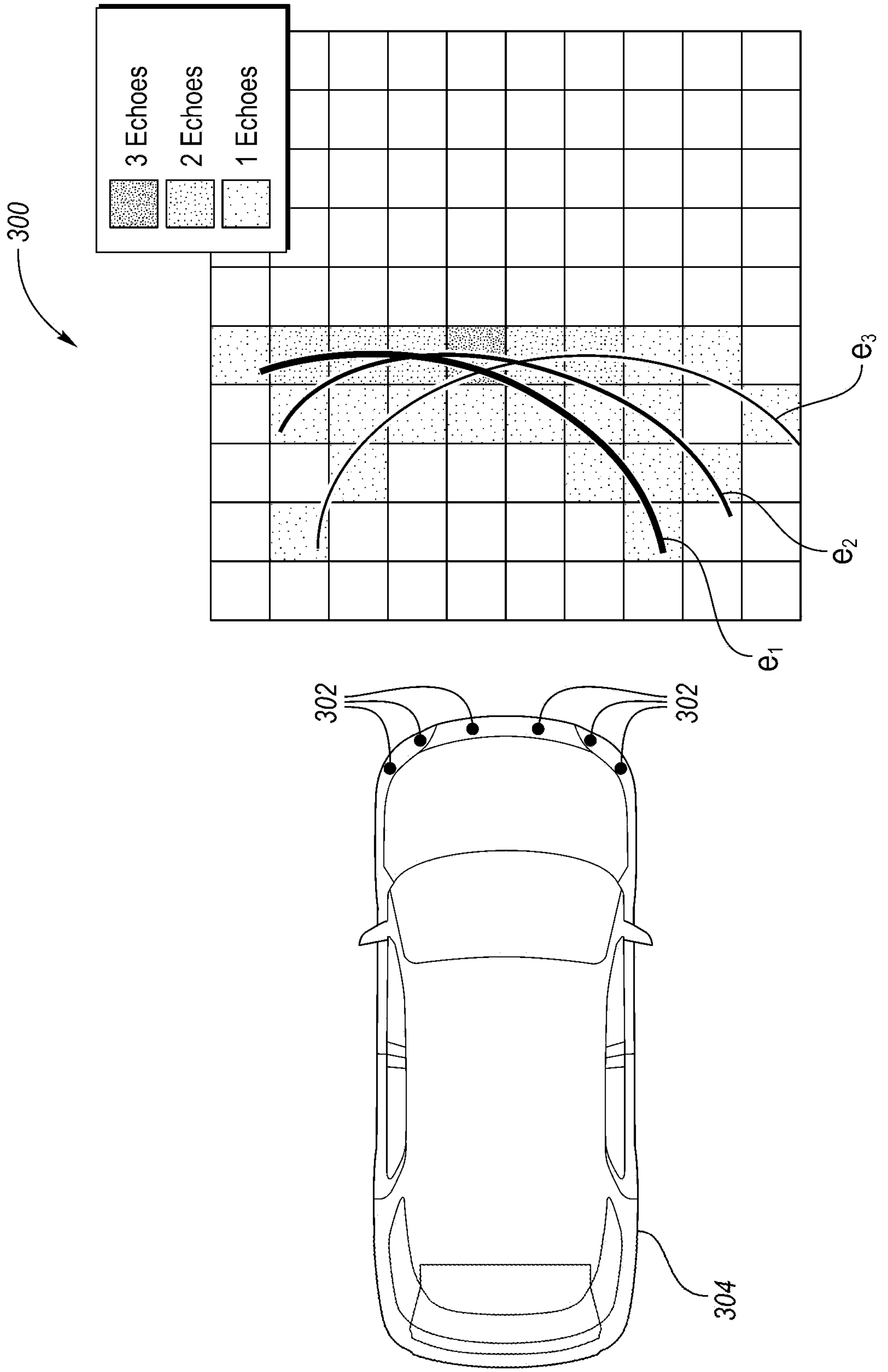
FIG. 3 illustrates a 2D slice of an example voxelized 3D point cloud in accordance with disclosed embodiments.

FIG. 3 illustrates a 2D slice of a 3D point cloud 300 with three echoes $e_1$ $e_2$ $e_2$ generated from signals emitted by a plurality of ultrasonic sensors 302 embedded on a vehicle 304. FIG. 3 indicates the number of echoes intersecting each 2D cell.

A 3D point cloud representation along with information relating to the echoes intersecting each 3D cell in the point cloud representation may be stored in non-transitory, computer-readable media as a 3D data structure, such a 3D array or a 3D matrix. In some disclosed embodiments, each 3D cell may include a center point of the cell, the number of echoes intersecting the 3D cell, and for each intersecting echo, an amplitude, and an azimuth angle. For example, a 3D cell may have a center point with coordinates P=(x,y,z) and may be intersected by echoes $e_1, \ldots, e_k$. The number of echoes $\text{num\_echoes}_P$, and a list of corresponding amplitudes $$(amp(e_i))_{i=1}^{k}$$

and azimuth angles $$(azi(e_i))_{i=1}^{k}$$

may be generated. In some disclosed embodiments, the azimuth angles are between the viewing direction of the center of the receiving sensor and the segment from the receiving center to the center point of the 3D cell.

The number of echoes intersecting a 3D grid cell may provide valuable information regarding the unknown coordinates of the reflection point. The higher this number (i.e., the darker shaded cells in FIG. 3), the higher the likelihood that the reflection point lies in that grid cell due to a trilateration argument. This heuristic argument, while an approximation of reality due to the presence of spurious echoes (i.e., uneven ground) and noise in the recorded distances, may be used to create a meaningful point cloud representation of ultrasonic data. An example of a point cloud generated from a single cycle of 4 echoes in shown in FIG. 2.

A difference between LiDAR and ultrasonic-based point clouds is that each point in a LiDAR point cloud already corresponds to the location of the laser beam reflection point, while each point in an ultrasonic point cloud corresponds to a possible location of the echo reflection point. This problem may be addressed by defining features associated to a point, such as the number of echoes in a cell, which allows to place more weight on the points with a higher likelihood of being close to the actual reflection point. For perception tasks, the 3D point cloud may be converted into a multi-channel 2D (or BEV) structure encoding echoes as described below, which may be used to train a deep learning algorithm, such as a deep learning algorithm used for computer vision.

A multi-channel 2D structure may be generated by projecting a single-cycle 3D point cloud representation onto a 2D plane comprising 2D cells with each 2D cell corresponding to one or more 3D cells of the 3D point cloud representation. For example, a 3-channel 2D structure may encode echo-intensity information (e.g., number of intersecting echoes), echo-amplitude information, and echo-azimuth-angle information. The resulting 2D plane may be stored in non-transitory, computer-readable media as 2D data structure, such as a 2D array or a 2D matrix. The projecting operation may also be referred to as superimposing.

Figure 4A:
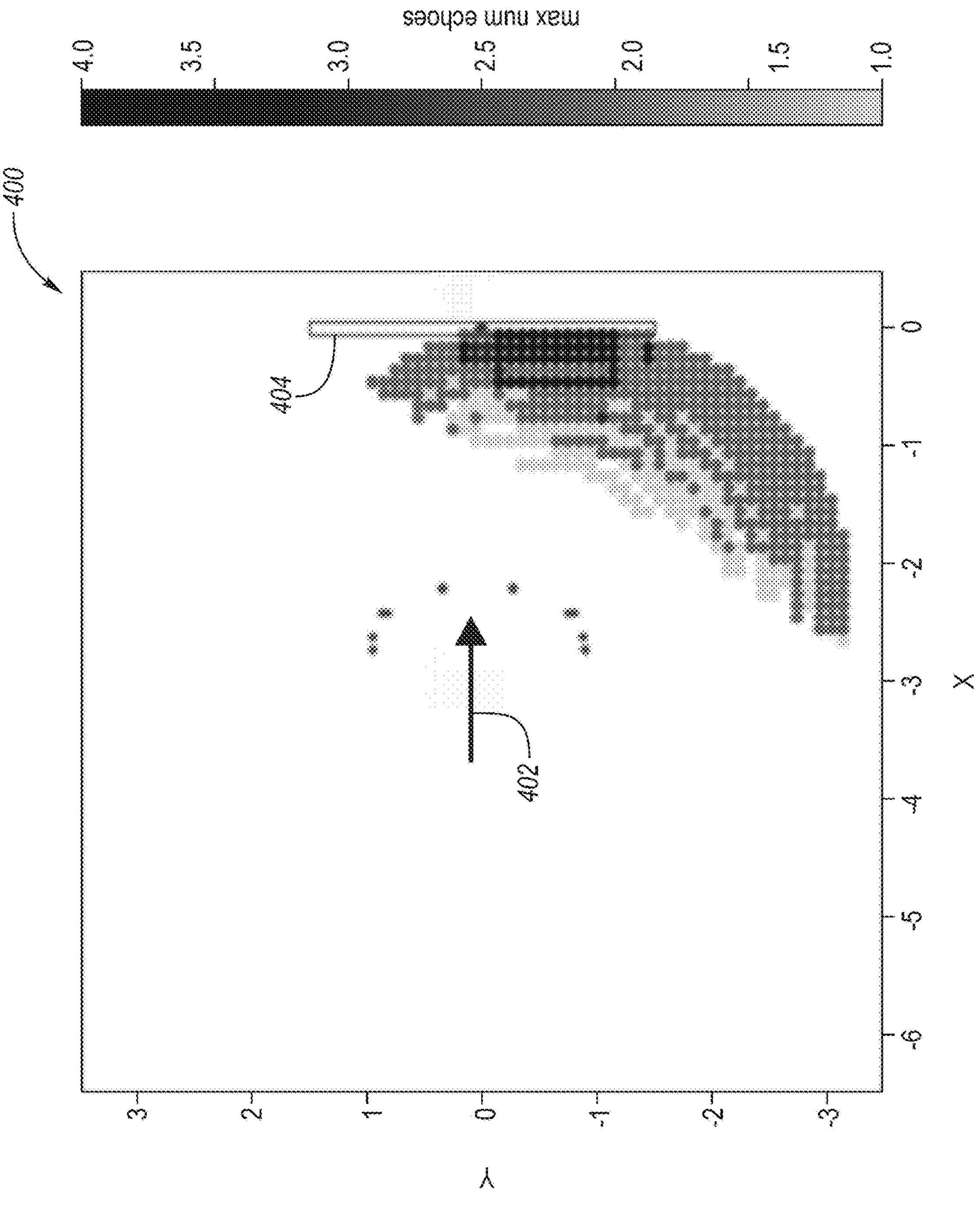
FIG. 4A illustrates an example 2D structure in accordance with disclosed embodiments.

FIG. 4A illustrates an example 2D structure 400 in accordance with disclosed embodiments. FIG. 4A illustrates echo-intensity information generated in a single cycle from echoes received at receiving sensors (not shown) embedded on a vehicle (not shown) moving toward an object 404 in the direction 402 shown in FIG. 4A. The darker-shaded 2D cells in FIG. 4 indicate a higher number of echoes in the 2D cell due to object 404 than lighter-shaded 2D cells.

For each cycle c in a plurality of cycles and for 2D cell (e.g., 5 cm by 5 cm) having a coordinate of (x*,y*) in a 3-channel 2D structure, the channel information may be encoded as follows. In disclosed embodiments, the echo-intensity information channel may be encoded according to:

$$\text{echo\_info}_{x^*,y^*}(c) = \max_{z} numecho_{x^*,y^*,z}(c),$$

where c is a given cycle, (x*,y*) is a coordinate of a 2D cell in the 2D plane, $\text{echo\_info}_{x^*,y^*}(c)$ is the echo-intensity information encoded in the 2D cell, and $\text{numecho}_{x^*,y^*,z}(c)$ is the number of echoes intersecting a 3D cell having a center point coordinate of (x*,y*,z) in the point cloud representation. The number of echoes intersecting a grid cell may provide valuable information regarding the unknown coordinates of the reflection point: the higher this number (i.e., the darker-shaded, higher intensity cells in FIG. 3, the higher the likelihood that the reflection point lies in that grid cell due to a trilateration argument. This heuristic argument, while an approximation of reality due to the potential presence of spurious echoes (i.e., uneven ground) and noise in the recorded distances, is useful in disclosed embodiments for creating a meaningful point cloud representation of ultrasonic data.

In disclosed embodiments, the echo-amplitude information channel may be encoded according to:

$$\text{amp\_info}_{x^*,y^*}(c) = \max\, maxamp_{x^*,y^*}(c) - minamp_{x^*,y^*}(c),$$

where c is a given cycle, (x*,y*) is a coordinate of a 2D cell in the 2D plane, $\text{amp\_info}_{x*,y*}(c)$ is the echo-amplitude information, $$\text{max}amp_{x^*,y^*}(c) = \max\left(\bigcup_z \bigcup_{e\in c, e\ crosses\ (x^*,y^*,z)} amp(e)\right),$$

$$\text{min}amp_{x^*,y^*}(c) = \min\left(\bigcup_z \bigcup_{e\in c, e\ crosses\ (x^*,y^*,z)} amp(e)\right),$$

and amp(e) is the amplitude of echo e. The azimuth-angle information may be encoded according to:

$$\text{azi\_info}_{x^*,y^*}(c) = \max\, \text{max}azi_{x^*,y^*}(c) - \text{min}azi_{x^*,y^*}(c),$$

where $\text{azi\_info}_{x*,y*}(c)$ is the azimuth angle information, $$\text{max}azi_{x^*,y^*}(c) = \max\left(\bigcup_z \bigcup_{e\in c, e\ crosses\ (x^*,y^*,z)} azi(e)\right),$$

$$\text{min}azi_{x^*,y^*}(c) = \min\left(\bigcup_z \bigcup_{e\in c, e\ crosses\ (x^*,y^*,z)} azi(e)\right),$$

and azi(e) is the azimuth angle of echo e. The he amplitude and azimuth channels encode non-trivial information about a grid cell's position relative to the sensors and the distribution of the amplitude values around it.

Single-cycle point-cloud data, such as described above with respect to FIG. 4A, may be directly transformed into 2D structures for perception tasks. However, a 2D structure generated from single-cycle point-cloud data may not be sufficiently informative for detection and localization purposes, due to the small number of echoes received during a single cycle. For example, the number of echoes received in the example illustrated in FIG. 2 ranges from 1 to 4, which may not provide sufficient resolution for computer vision tasks.

Figure 4B:
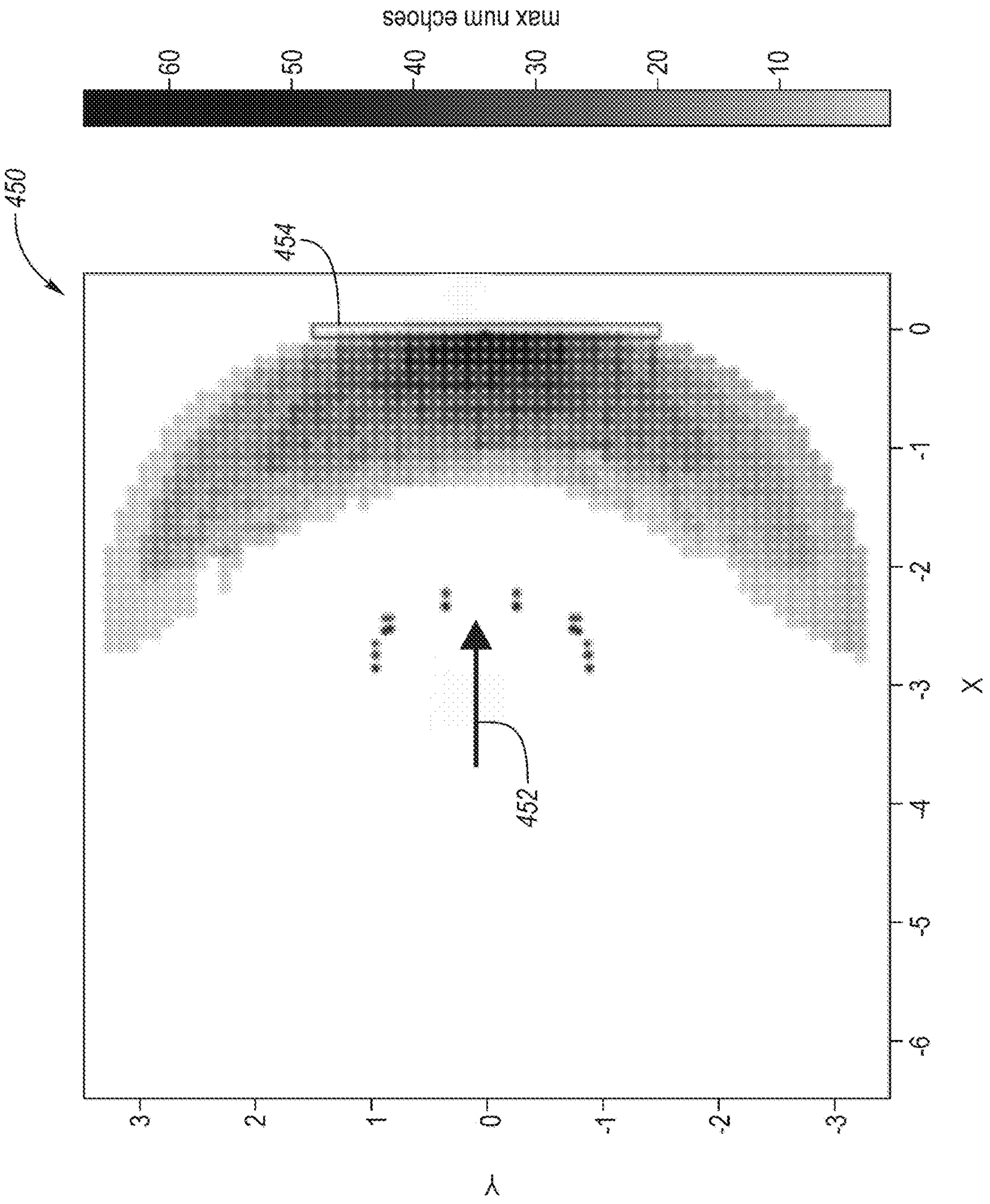
FIG. 4B illustrates an example of an aggregated sequence of 2D structures in accordance with disclosed embodiments.

To address this issue, disclosed embodiments may utilize a temporal aggregation of 2D BEV data across a specified range of cycles. Aggregation may be performed in a rolling window fashion using past data. For example, let $c_{t_1}, c_{t_2}, \ldots, c_{t_N}$ be a sequence of cycles in our measurement, corresponding to timestamps $t_1, t_2, \ldots, t_N$, and let K be an integer representing the window size. At time $t_i$, the BEV structures of K past cycles $c_{t_{i-K+1}}, \ldots, c_{t_i}$ are aggregated into one single BEV structure by first offsetting each cycle's BEV structure by an amount needed to match the vehicle's position at the final cycle $t_i$. The exact offset calculation is possible because objects may be presumed to be static, and the speed and direction of the vehicle is known. FIG. 4B illustrates an example 2D data structure 450 resulting from an aggregation of 2D data structures obtained during a sequence of K=32 cycles as a vehicle (not shown) moves toward an object 454 in the direction 452.

Thus, a channel-dependent, temporal-aggregation strategy may be performed as follows. Aggregation may be performed via sum operations over all K cycles. The echo-intensity channel may be aggregated according to:

$$\text{aggregated\_echo\_info}_{x^*,y^*}(c_{t_i}, K) = \sum\nolimits_{j=i-K+1}^{i} \max \text{echo\_info}_{x^*,y^*}(\widetilde{c_{t_j}}),$$

where $\text{echo\_info}_{x*,y*}(\widetilde{c_{t_j}})$ refers to the echo-intensity information $\text{echo\_info}_{x*,y*}(c_{t_j})$ encoded as described above with respect to cycle $c_{t_j}$ after accounting for the offset described above. It should be noted that $\text{echo\_info}_{x*,y*}(\widetilde{c_{t_i}})=\text{echo\_info}_{x*,y*}(c_{t_i})$ since there is no offset at the final cycle $c_{t_i}$.

The echo-amplitude information may be aggregated according to:

$$\text{aggregated\_amp\_info}_{x^*,y^*}(c_{t_i}, K) = \max\nolimits_{j=i-K+1}^{i} \text{max}amp_{x^*,y^*}(\widetilde{c_{t_j}}) - \min\nolimits_{j=K+1}^{i} \text{min}amp_{x^*,y^*}(\widetilde{c_{t_j}}),$$

where K is the number of cycles in the sequence of cycles, $c_{t_i}$ is the last cycle in the sequence of cycles, max $\text{amp}_{x*,y*}(\widetilde{c_{t_j}})$ refers to $\text{maxamp}_{x*,y*}(c_{t_j})$ as described above after accounting for the offsetting, and $\text{minamp}_{x*,y*}(\widetilde{c_{t_j}})$ refers to $\text{minamp}_{x*,y*}(c_{t_j})$ as described above after accounting for the offsetting.

The echo-azimuth-angle information may be aggregated according to:

$$\text{aggregated\_azi\_info}_{x^*,y^*}(c_{t_i}, K) = \max\nolimits_{j=i-K+1}^{i} \text{max}azi_{x^*,y^*}(\widetilde{c_{t_j}}) - \min\nolimits_{j=K+1}^{i} \text{min}azi_{x^*,y^*}(\widetilde{c_{t_j}}),$$

where K is the number of cycles in the sequence of cycles, $c_{t_i}$ is the last cycle in the sequence of cycles, $\text{maxazi}_{x*,y*}(\widetilde{c_{t_j}})$ refers to $\text{maxazi}_{x*,y*}(c_{t_j})$ as described above after accounting for the offsetting, and $\text{minazi}_{x*,y*}(\widetilde{c_{t_j}})$ refers to $\text{minazi}_{x*,y*}(c_{t_j})$ described above after accounting for the offsetting.

Figure 5A:
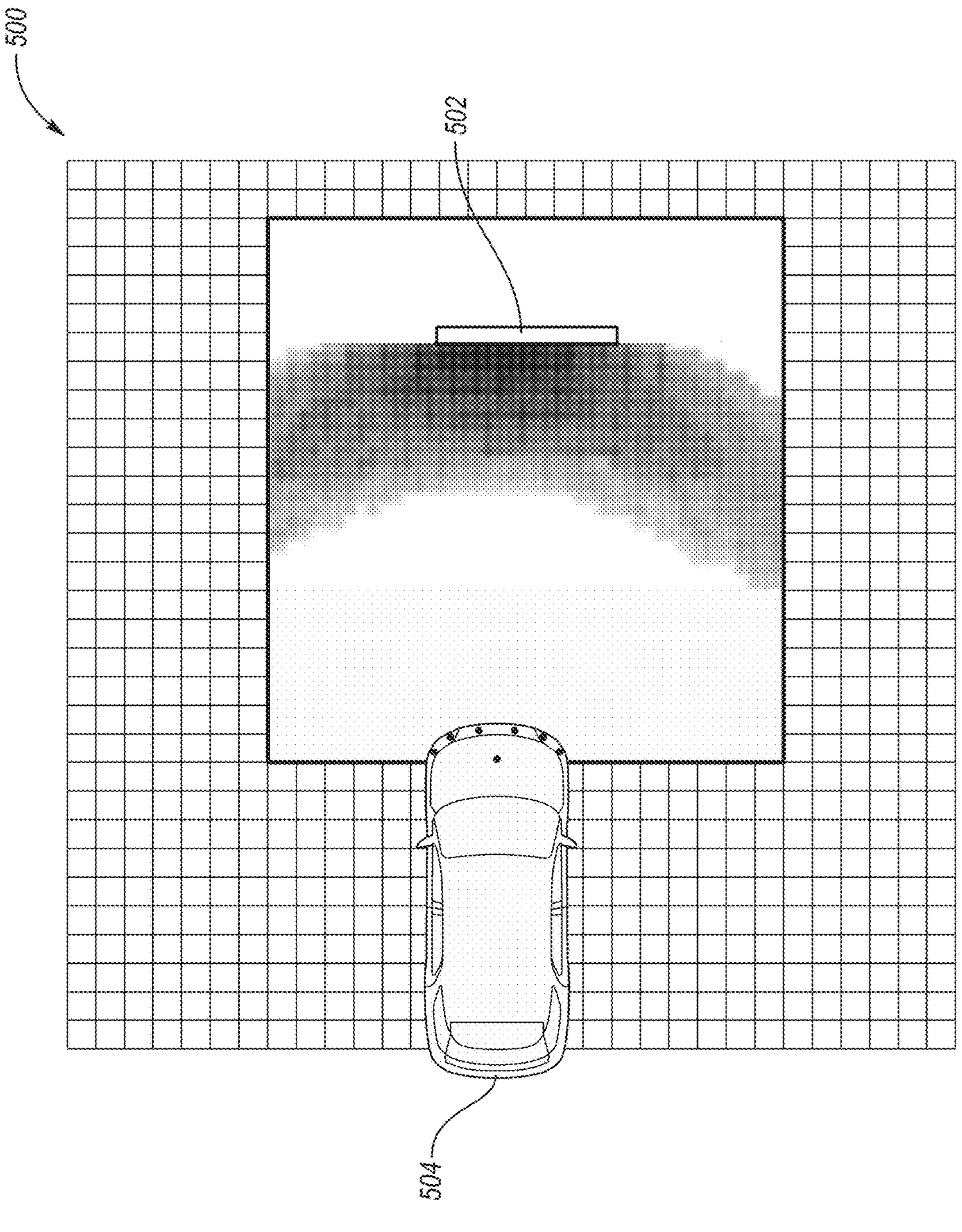
FIG. 5A illustrates an example embodiment including a FoV for a vehicle 504 in accordance with disclosed embodiments.
Figure 5B:
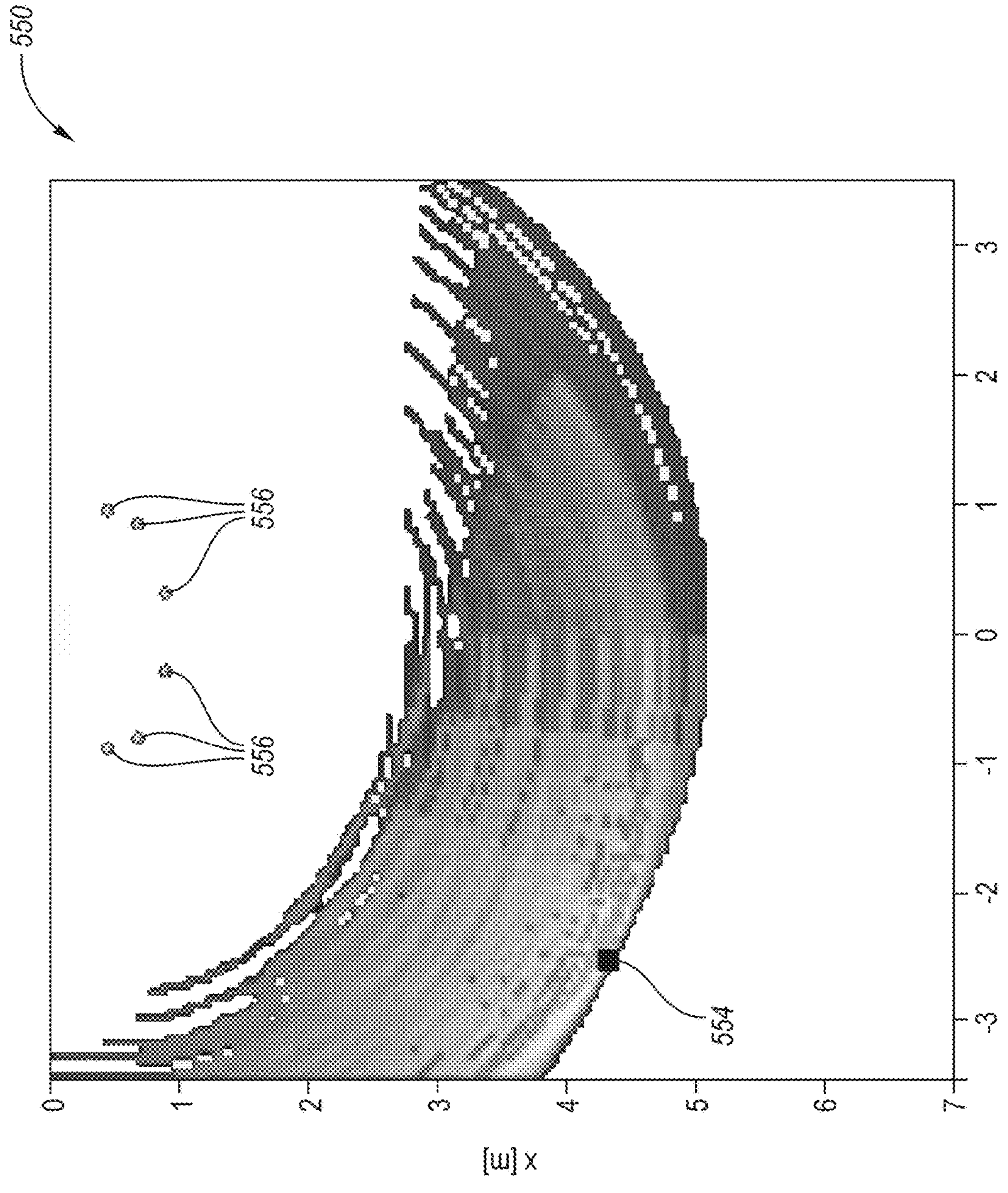
FIG. 5B illustrates an example embodiment including a 2D image showing echo-intensity channel values resulting from a pole object and echoes received at ultrasonic sensors embedded on a vehicle.

In some disclosed embodiments, 2D data structures resulting from a temporal aggregation of 2D BEV data structures obtained during a sequence of cycles may be used to generate training data for training a machine-learning model. Temporally-aggregated 2D data structures may be cropped into a Field of View ("FoV") of interest for an ultrasonic application. FIG. 5A illustrates an example embodiment 500 including a FoV 502 for a vehicle 504. A FoV may be a square region (e.g., 7 meters by 7 meters) in front of a vehicle. The channel values in a FoV cropped region of temporally-aggregated 2D data structure may be normalized in the range [0, 255] to account for a large variance in voxel's intensity across different time-aggregated samples. A 2D image of a temporally-aggregated 2D data structure may be created with each pixel in the 2D image corresponding to a grid cell (e.g., 5 cm by 5 cm) in the temporally-aggregated 2D data structure. Each pixel in a 2D image may be matched with a ground truth value since the location of any objects are known. A plurality of pixels, with each pixel having a ground truth value (e.g., 1 or 100%) indicating an object is present, may be represented as a bounding box for the object. FIG. 5*b* illustrates an example embodiment 550 including a 2D image showing echo-intensity channel values resulting from a pole object 554 and echoes received at ultrasonic sensors 556 embedded on a vehicle (not shown).

A plurality of 2D images along with their corresponding ground truth values generated in accordance with disclosed embodiments may be used as training data to train machine-learning models for object detection and/or localization. In some disclosed embodiments, a trained machine-learning model includes a neural network that may generate bounding boxes representing objects when 2D images of disclosed embodiments are input into the trained neural network.

In some disclosed embodiments, a single-shot detector ("SSD") is trained to perform object detection using the 2D images generated as described above. The SSD may include 1) a backbone network that computes a convolutional feature map over an entire input image and 2) a SSD head including convolutional layers responsible for object classification and bounding box regression on the backbone's output. Some disclosed embodiments focus on detection and localization and not on object classification. For those disclosed embodiments, two classes are used for the classification layer (object and no object). The output of the SSD for each test image is a set of predicted bounding boxes together with a corresponding confidence score in [0, 1], which quantifies the likelihood of the box containing an object.

In order to obtain accurate 2D bounding boxes predictions several post-processing steps may be performed over the raw output of a trained machine-learning model. A standard non-maximum suppression ("NMS") may be performed to reduce the number of redundant and overlapping boxes, which is controlled by intersection over union ("IoU") values and confidence score thresholds. While NMS is usually enough for most image-based detection tasks, the nature of ultrasonic data may demand additional filtering steps to reduce the number of output bounding boxes.

Disclosed embodiments of ultrasonic-based 2D data structures may encode a set of potential reflection points of an echo (i.e., the echo's locus), rather than the actual reflection points. Therefore, the resulting 2D image will have a relatively high number of small, but non-zero pixels, corresponding to regions of the image far away from a reflection point, which may be crossed by an echo's locus. At the same time, regions closer to the ground truth object tend to have higher-value pixels, but the distribution of values varies significantly across frames due to different location, shape, and material of the objects. Consequently, an SSD model may predict many low-confidence boxes in regions without objects (which can safely be removed by NMS), but the confidence scores for true positives boxes can vary significantly. Additionally, blanket removal of boxes based on a low absolute confidence threshold in NMS may discard true positives, where the low score true positive box might be filtered out. Setting a high threshold might result in too many false positives boxes.

Accordingly, we a post-processing step based on a relative confidence threshold may be added to discard remaining boxes post-NMS based on relative delta score between predicted boxes, on a per-frame basis. Given a test 2D data structure generated using K cycles $c_{t_{i-K+1}}, \ldots, c_{t_i}$, the output of the model is a minimal set of bounding boxes and confidence scores, representing the predicted location of the objects in the scene relative to the position of a vehicle at time $t_i$.

Figure 6:
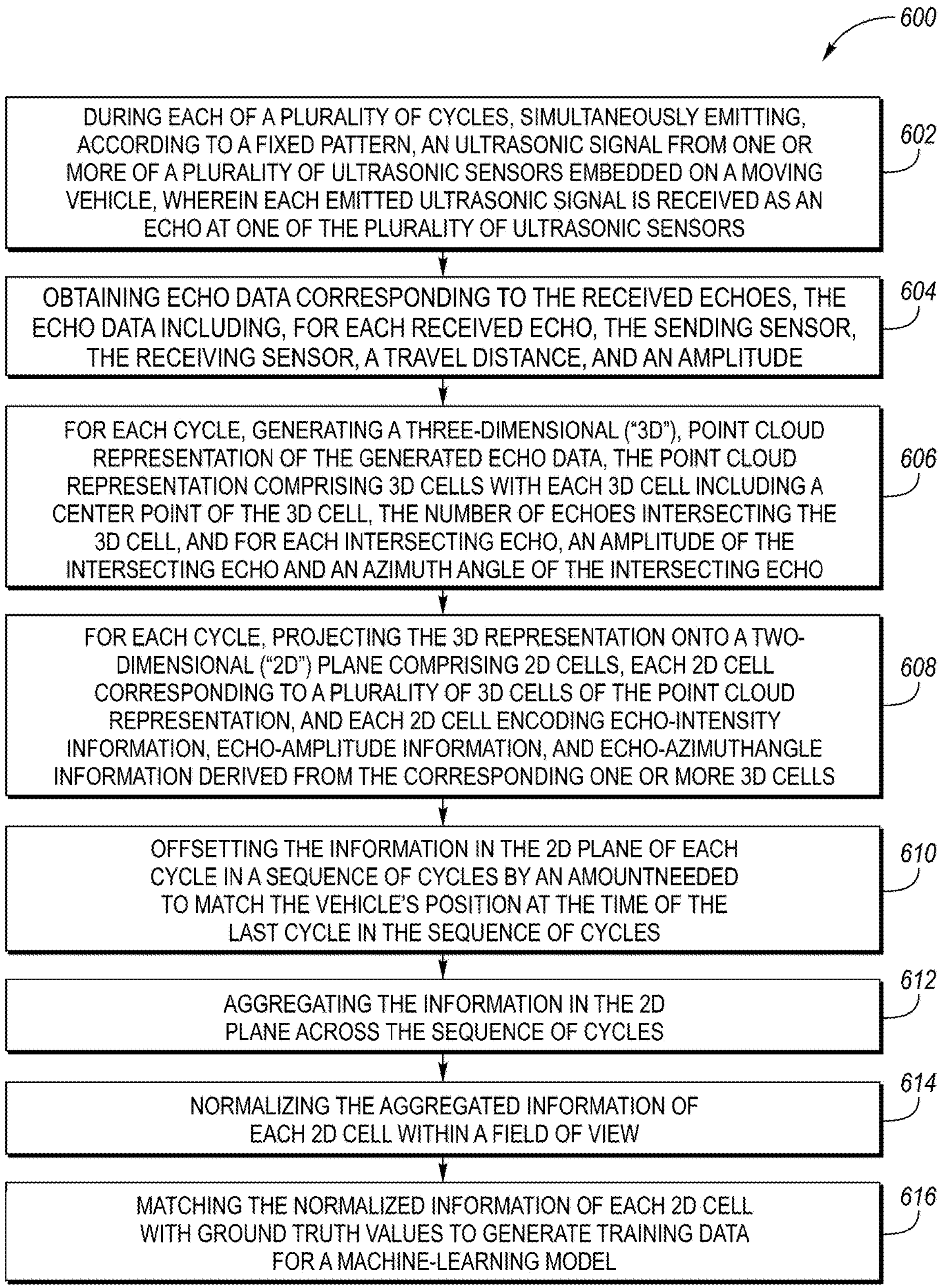
FIG. 6 illustrates an example of method for training a machine-learning model in accordance with disclosed embodiments.
Figure 7:
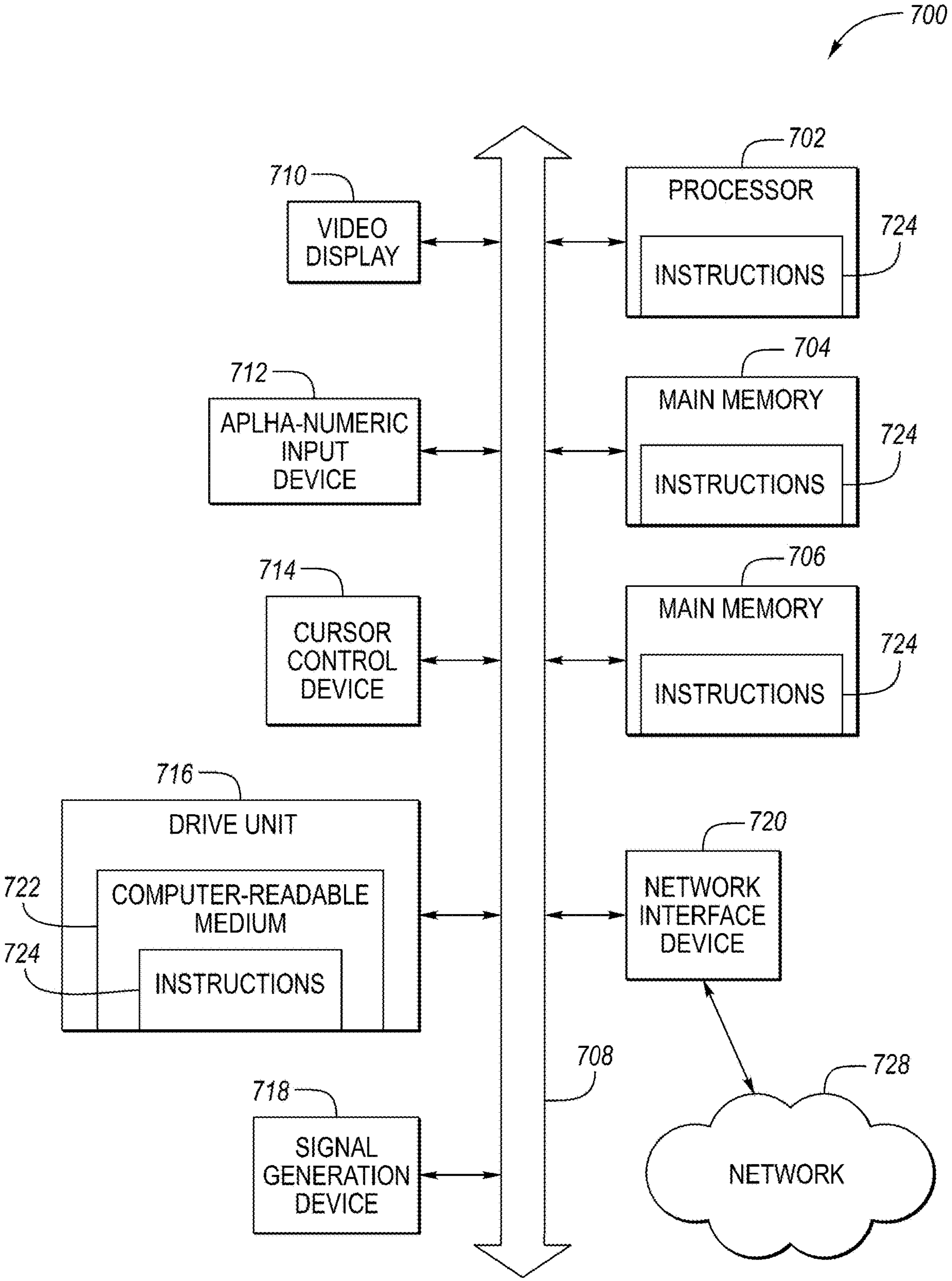
FIG. 7 illustrates an example of an example embodiment of a general computer system in accordance with disclosed embodiments.

FIG. 6 illustrates an example method 600 in accordance with disclosed embodiments. The method 600 may be advantageously used to generate training data for training a machine learning model. The method 600 may be performed by a system that includes the general computing system 700 disclosed in FIG. 7. At operation 602, the method 600 may include: during each of a plurality of cycles, simultaneously emitting, according to a fixed pattern, an ultrasonic signal from one or more of a plurality of ultrasonic sensors embedded on a moving vehicle, wherein each emitted ultrasonic signal is received as an echo at one of the plurality of ultrasonic sensors. At operation 604, the method 600 may obtain echo data corresponding to the received echoes, the echo data including, for each received echo, the sending sensor, the receiving sensor, a travel distance, and an amplitude. At operation 606, the method 600 may include: for each cycle, generating a three-dimensional ("3D"), point cloud representation of the generated echo data, the point cloud representation comprising 3D cells with each 3D cell including a center point of the 3D cell, the number of echoes intersecting the 3D cell, and for each intersecting echo, an amplitude of the intersecting echo and an azimuth angle of the intersecting echo. At operation 608, the method may include: for each cycle, projecting the 3D representation onto a two-dimensional ("2D") plane comprising 2D cells, each 2D cell corresponding to a plurality of 3D cells of the point cloud representation, and each 2D cell encoding echo-intensity information, echo-amplitude information, and echo-azimuth-angle information derived from the corresponding one or more 3D cells. At operation 610, the method 600 may offset the information in the 2D plane of each cycle in a sequence of cycles by an amount needed to match the vehicle's position at the time of the last cycle in the sequence of cycles. At operation 612, the method 600 may aggregate the information in the 2D plane across the sequence of cycles. At operation 614, the method 600 may normalize the aggregated information of each 2D cell within a field of view. At operation 616, the method 600 may match the normalized information of each 2D cell with ground truth values to generate training data for a machine-learning model FIG. 7 shows a block diagram of an example embodiment of a general computer system 700. The computer system 700 can include a set of instructions that can be executed to cause the computer system 700 to perform any one or more of the methods or computer-based functions disclosed herein. For example, the computer system 700 may include executable instructions to perform functions of the method disclosed in FIG. 6. The computer system 700 may be connected to other computer systems or peripheral devices via a network. Additionally, the computer system 700 may include or be included within other computing devices.

As illustrated in FIG. 7, the computer system 700 may include one or more processors 702. The one or more processors 702 may include, for example, one or more central processing units (CPUs), one or more graphics processing units (GPUs), or both. The computer system 700 may include a main memory 704 and a static memory 706 that can communicate with each other via a bus 708. As shown, the computer system 700 may further include a video display unit 710, such as a liquid crystal display (LCD), a projection television display, a flat panel display, a plasma display, or a solid-state display. Additionally, the computer system 700 may include an input device 712, such as a remote-control device having a wireless keypad, a keyboard, a microphone coupled to a speech recognition engine, a camera such as a video camera or still camera, or a cursor control device 714, such as a mouse device. The computer system 700 may also include a disk drive unit 716, a signal generation device 718, such as a speaker, and a network interface device 720. The network interface 720 may enable the computer system 700 to communicate with other systems via a network 728. For example, the network interface 720 may enable the machine learning system 120 to communicate with a database server (not show) or a controller in manufacturing system (not shown).

In some embodiments, as depicted in FIG. 7, the disk drive unit 716 may include one or more computer-readable media 722 in which one or more sets of instructions 724, e.g., software, may be embedded. For example, the instructions 724 may embody one or more of the methods or functionalities, such as the methods or functionalities disclosed herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In some embodiments, dedicated hardware implementations, such as application specific integrated circuits, programmable logic arrays and other hardware devices, can be constructed to implement one or more of the methods or functionalities described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or functionalities disclosed herein.

In some embodiments, some or all the computer-readable media will be non-transitory media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

Object Detection Experiments

Given the rolling-window nature of the temporal aggregation method of disclosed embodiments, each 2D image belonging to the same approach trajectory (each trajectory line in FIG. 1) overlaps with some of the preceding images. Moreover, these samples may be correlated to each other due to the similar reflection angles. To avoid data contamination between training and test data, a train/test split was created by assigning all samples belonging to the same trajectory to either the training set or the test set, in a 70/30 proportion. Additional preprocessing included removing samples spanning a different temporal duration than intended (i.e., outside $[1-\epsilon, 1+\epsilon]$ seconds for K=32 cycles) as well as samples with zero-value entries in all channels, corresponding to anomalies in the data collection process. This resulted in 86K and 39.5K images for training and testing, respectively.

For evaluation, mAP50 was used, the mean average precision at (IoU) value of 0.5, as well as the overall mAP averaged over 10 IoU thresholds between 0.5 and 0.95 based on the COCO implementation. While these metrics have been the standard for camera-based object-detection models, they were unable to fully capture the prediction quality in several scenarios, where the object size in the grid-based 2D representation can be as low as 2 pixels, such as poles and curbstones. Such predictions can have a low IoU value despite a satisfying quality of the localization accuracy, resulting in the mAP being an over-conservative metric.

Thus, in addition to these commonly used metrics, a customized key performance indicator ("KPI") metric accounting for additional indicators of detection quality was developed. First, each predicted box was paired to a ground truth box based on IoU levels, and the IoU, area similarity, and distance scores for each pair was computed. The area similarity score is the minimum between the ratios of area between ground truth and predicted box, and vice versa. The distance score was measured by taking the Euclidean distance between the center of the boxes, and then applying a transformation of the type $e^{-\propto x}$ to scale the score in the range [0, 1], where $\propto$ is set based on an empirical study. Next, the custom KPI for a predicted box is obtained by taking the average of IoU, area and distance scores. Finally, the overall KPI was obtained by taking the average of all KPIs weighted by the corresponding bounding box's confidence score, after penalizing for false positives and missed detections.

Example machine-learning models were created using Res-Net-50 as a backbone in accordance with disclosed embodiments. Specifically, weights were initialized using transfer learning from a pretrained model on COCO dataset. Despite the model being pre-trained for RGB images, the initialization proved helpful for ultrasonic-based images as well, thanks to the spatial-invariant nature of the representation. Our default model was trained with a batch size of 32, 50000 steps, stochastic gradient descent ("SGD") with a cosine learning rate decay with base and cosine learning rate equal to $4 \cdot 10^{-2}$ and $1.33 \cdot 10^{-2}$, respectively, and 4000 warm-up steps. The input images were resized to 640×640 pixels while keeping the height/width ratio of the original images fixed, and a temporal aggregation of K=32 cycles was used. A weighted smooth (and weighted sigmoid focal loss were used for localization and classification, respectively. For data augmentation, random horizontal flip and random cropping was used.

The default model's overall and object-level performance, evaluated over 7 different classes of objects, is reported in Table 2. The default model reaches a $mAP_{50}$ of 75.82 and a custom KPI value of 75.52. The object-level performance based on custom KPI was analyzed, with objects such as bicycle, child dummy, toy car and pole scoring the highest, whereas speedbump posed the most challenges for ultrasonic-based detection. This can possibly be attributed to the smooth round shape of speedbumps resulting in a large variance of echoes reflection angles. It is noted that curbstones, although having a similar height as speedbumps, are localized with better accuracy.

TABLE 2

| | | | New KPI | | | | | | | |
|---|---|---|---|---|---|---|---|---|---|---|
| Model | $mAP_{50}$ | mAP | Overall | Bike | Childummy | Toy Car | Pole | Curbstone | Wall | Speedbump |
| Ours (default) | 75.82 | 40.65 | 75.53 | 86.53 | 79.6 | 74.96 | 71.83 | 69.76 | 68.26 | 49.12 |
| Baseline | 18.88 | 7.03 | 47.17 | 53.62 | 46.9 | 43.86 | 37.05 | 47.36 | 46.4 | 31.67 |

The absence of prior research on USS-based object detection imposes significant limitations on the ability to make direct comparisons. Nonetheless, to establish a baseline for comparison purposes, a baseline from our study was generated. In particular, the baseline comparison methodology uses only the basic channel aggregated_echo_info and does not have any temporal aggregation. For fair comparisons, the example machine-learning models using Res-Net-50 as a backbone described above was used for both methodologies. Table 2 shows the ultrasonic based object detection performance of both baseline and default model. The multi-channel, temporally-aggregated model shows significant improvement compared to the single-channel, non-aggregated baseline, in terms of both mAP and custom KPI. This result confirms the importance of increasing the resolution of the BEV representation by means of the temporal aggregation procedure described in accordance with disclosed embodiments.

Generally, baseline models fail to correctly detect and localize, whereas models trained on temporally-aggregated, multi-channel images in accordance with disclosed embodiments show improved performance in terms of both detection and localization. The distance from the object and the reflection angle may impact performance. The default model disclosed above performs well overall and is particularly accurate when objects are in front of the car and <3 meters from the bumper and tend to become slightly more inaccurate as the distance increase and the objects are further away from the frontal field of view. The single-channel, non-time-aggregated baseline performs significantly worse, but still shows the same qualitative pattern of relative performance for different distances and angle.

The default model described above was trained, in accordance with disclosed embodiments, separately on single-channel images as well as on images with different channel combinations. The results are disclosed in Table 3. As illustrated in Table 3, the most relevant information is contained in the max echoes channel. The amplitude and azimuth angle channels have less expressive power and lead to sub-par performances, either taken alone or in combination. Adding amplitude and azimuth information on top of the main echoes channel improves the performance, if only incrementally, with the model trained on all three channels achieving the best performance among all the combinations. This suggests that including additional channels, leveraging domain knowledge of the underlying ultrasonic physics, may further enhance the performance.

TABLE 3

| ch. ech | ch. amp | ch. azi | $mAP_{50}$ | mAP | Custom KPI |
|---|---|---|---|---|---|
| ✓ | ✓ | ✓ | 75.82 | 40.65 | 75.53 |
| ✓ | | | 71.69 | 37.74 | 75.44 |
| | ✓ | | 49.89 | 20.12 | 68.16 |
| | | ✓ | 50.23 | 20.22 | 68.59 |
| ✓ | ✓ | | 71.76 | 36.37 | 74.19 |
| ✓ | | ✓ | 73.03 | 38.75 | 74.59 |
| | ✓ | ✓ | 56.59 | 23.81 | 68.98 |

In some disclosed embodiments, object detection models trained with a Stochastic Gradient Descent ("SGD") optimizer achieved significantly better performance than object detection models trained with an Adams optimizer. In some disclosed embodiments, models trained using SGD without momentum provided further improvement over models trained using SGD with momentum.

A 640×640 resolution was compared with 1024×1024 resolution using an SGD optimizer without momentum. As opposed to other sensing modalities such as camera, the model performs slightly better with decreased resolution. A possible explanation for this result is the fact that ultrasonic-based BEV images are low-resolution by construction, since the pixel size may correspond to a relatively large (e.g., 5 cm by 5 cm) square. This pixel size is lower bounded by the actual margin of error of ultrasonic sensors, and excessive artificial upscaling can hinder the model's ability to learn key features such as object boundaries.

In disclosed embodiments, model performance was compared using varying numbers of training steps. Model performance improved slightly with higher numbers of steps.

In some disclosed embodiments, a cosine decay learning rate schedule was compared with a fixed learning rate. The cosine decay learning schedule achieved significantly better results.

In some disclosed embodiments, different aggregation window sizes (i.e., K=2, 5, 10, 15, 20, 25, 32, 64) corresponding to temporal duration between 0.05 and 2 seconds were compared. While both $mAP_{50}$ and custom KPI increased with K, the improvement tended to saturate and gives diminishing return after approximately K=16, corresponding to ~0.5 seconds. This is especially important as longer temporal aggregation of 32 or 64 cycles (corresponding to 1 or 2 seconds) might not be feasible in real time scenarios with higher-speed vehicles and moving objects, where information from past ultrasonic cycles might become outdated quicker.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for detecting objects in a field of view of a vehicle, the method comprising:

during each of a plurality of cycles, simultaneously emitting, according to a fixed pattern, an ultrasonic signal from one or more of a plurality of ultrasonic sensors embedded on a vehicle, wherein each emitted ultrasonic signal is received as an echo at one of the plurality of ultrasonic sensors;

obtaining echo data corresponding to the received echoes, the echo data including, for each received echo, the sending sensor, the receiving sensor, a travel distance, and an amplitude;

for each cycle, generating a three-dimensional ("3D"), point cloud representation of the generated echo data, the point cloud representation comprising 3D cells with each 3D cell including a center point of the 3D cell, the number of echoes intersecting the 3D cell, and for each intersecting echo, an amplitude of the intersecting echo and an azimuth angle of the intersecting echo;

for each cycle, projecting the 3D representation onto a two-dimensional ("2D") plane comprising 2D cells, each 2D cell corresponding to a plurality of 3D cells of the point cloud representation, and each 2D cell encoding echo-intensity information, echo-amplitude information, and echo-azimuth-angle information derived from the corresponding one or more 3D cells, the echo-intensity information is determined according to:

$$\text{echo\_info}_{x^*,y^*}(c) = \max_{z} numecho_{x^*,y^*,z}(c),$$

where c is a given cycle, (x*,y*) is a coordinate of a 2D cell in the 2D plane, $\text{echo\_info}_{x^*,y^*}(c)$ is the echo-intensity information encoded in the 2D cell, and $\text{numecho}_{x^*,y^*,z}(c)$ is the number of echoes intersecting a 3D cell having a center point coordinate of (x*,y,z) in the point cloud representation, offsetting the information in the 2D plane of each cycle in a sequence of cycles by an amount needed to match the vehicle's position at the time of the last cycle in the sequence of cycles;

aggregating the information in the 2D plane across the sequence of cycles to obtain ultrasonic sensor echo data, wherein echo-intensity information is aggregated according to:

$$\text{aggregated\_echo\_info}_{x^*,y^*}\left(c_{t_i}, K\right) = \sum_{j=i-K+1}^{i} \max \text{echo\_info}_{x^*,y^*}(\widetilde{c_{t_j}}),$$

where K is the number of cycles in the sequence of cycles, $c_{t_i}$ is the last cycle in the sequence of cycles, $\text{echo\_info}_{x^*,y^*}(\widetilde{c_{t_j}})$ refers to the echo-intensity information $\text{echo\_info}_{x^*,y^*}(c_{t_j})$ after accounting for the offsetting; and detecting objects in the field of view of the vehicle using a machine learning model trained to operate on ultrasonic sensor echo data including 2D cells encoding aggregated echo-intensity information, echo-amplitude information, and echo-azimuth-angle information corresponding to the field of view.

2. The method of claim 1, wherein the echo-amplitude information is determined according to:

$$\text{amp\_info}_{x^*,y^*}(c) = \max \max amp_{x^*,y^*}(c) - \min amp_{x^*,y^*}(c),$$

where C is a given cycle, (x*,y*) is a coordinate of a 2D cell in the 2D plane, $\text{amp\_info}_{x^*,y^*}(c)$ is the echo-amplitude information, $$\max amp_{x^*,y^*}(c) = \max\left(\bigcup_{z} \bigcup_{e \in c, e\ crosses\ (x^*,y^*,z)} amp(e)\right),$$

$$\min amp_{x^*,y^*}(c) = \min\left(\bigcup_{z} \bigcup_{e \in c, e\ crosses\ (x^*,y^*,z)} amp(e)\right),$$

amp(e) is the amplitude of echo e.

3. The method of claim 2, wherein the echo-amplitude information is aggregated according to:

$$\text{aggregated\_amp\_info}_{x^*,y^*}\left(c_{t_i}, K\right) = \max_{j=i-K+1}^{i} \max amp_{x^*,y^*}(\widetilde{c_{t_j}}) - \min_{j=K+1}^{i} \min amp_{x^*,y^*}(\widetilde{c_{t_j}}),$$

where K is the number of cycles in the sequence of cycles, $c_{t_i}$ is the last cycle in the sequence of cycles, $\text{maxamp}_{x^*,y^*}(\widetilde{c_{t_j}})$ refers to $\text{maxamp}_{x^*,y^*}(c_{t_j})$ after accounting for the offsetting, and $\text{minamp}_{x^*,y^*}(\widetilde{c_{t_j}})$ refers to $\text{minamp}_{x^*,y^*}(c_{t_j})$ after accounting for the offsetting.

4. The method of claim 1, wherein the echo-azimuth-angle information is determined according to $$\text{azi\_info}_{x^*,y^*}(c) = \max \max azi_{x^*,y^*}(c) - \min azi_{x^*,y^*}(c),$$

where $\text{azi\_info}_{x^*,y^*}(c)$ is the azimuth angle information, $$\max azi_{x^*,y^*}(c) = \max\left(\bigcup_{z} \bigcup_{e \in c, e\ crosses\ (x^*,y^*,z)} azi(e)\right),$$

$$\min azi_{x^*,y^*}(c) = \min\left(\bigcup_{z} \bigcup_{e \in c, e\ crosses\ (x^*,y^*,z)} azi(e)\right),$$

5. The method of claim 4, wherein the echo-azimuth-angle information is aggregated according to:

$$\text{aggregated\_azi\_info}_{x^*,y^*}\left(c_{t_i}, K\right) = \max_{j=i-K+1}^{i} \max azi_{x^*,y^*}(\widetilde{c_{t_j}}) - \min_{j=K+1}^{i} \min azi_{x^*,y^*}(\widetilde{c_{t_j}}),$$

where K is the number of cycles in the sequence of cycles, $c_{t_i}$ is the last cycle in the sequence of cycles, $\text{maxazi}_{x^*,y^*}(\widetilde{c_{t_j}})$ refers to $\text{maxazi}_{x^*,y^*}(c_{t_j})$ after accounting for the offsetting, and $\text{minazi}_{x^*,y^*}(\widetilde{c_{t_j}})$ refers to $\text{minazi}_{x^*,y^*}(c_{t_j})$ after accounting for the offsetting.

6. The method of claim 1, further comprising:

normalizing the aggregated information of each 2D cell within a field of view.

7. The method of claim 6, further comprising:

matching the normalized information of each 2D cell with ground truth values to generate training data for a machine-learning model.

8. The method of claim 6, further comprising:

inputting the normalized 2D plane values into a trained machine-learning model to generate a plurality of bounding boxes and confidence scores, wherein each bounding box is paired with a confidence score that quantifies the likelihood of the bounding box containing an object.

9. A method for detecting objects in a field of view of a vehicle, the method comprising:

during each of a plurality of cycles, simultaneously emitting, according to a fixed pattern, an ultrasonic signal from one or more of a plurality of ultrasonic sensors embedded on a vehicle, wherein each emitted ultrasonic signal is received as an echo at one of the plurality of ultrasonic sensors;

obtaining echo data corresponding to the received echoes, the echo data including, for each received echo, the sending sensor, the receiving sensor, a travel distance, and an amplitude;

for each cycle, generating a three-dimensional ("3D"), point cloud representation of the generated echo data, the point cloud representation comprising 3D cells with each 3D cell including a center point of the 3D cell, the number of echoes intersecting the 3D cell, and for each intersecting echo, an amplitude of the intersecting echo and an azimuth angle of the intersecting echo;

for each cycle, projecting the 3D representation onto a two-dimensional ("2D") plane comprising 2D cells, each 2D cell corresponding to a plurality of 3D cells of the point cloud representation, and each 2D cell encoding echo-intensity information, echo-amplitude information, and echo-azimuth-angle information derived from the corresponding one or more 3D cells, the echo-amplitude information is determined according to:

$$\text{amp\_info}_{x^*,y^*}(c) = \max \text{max}amp_{x^*,y^*}(c) - \text{min}amp_{x^*,y^*}(c),$$

where C is a given cycle, $(x^*,y^*)$ is a coordinate of a 2D cell in the 2D plane, $\text{amp\_info}_{x^*,y^*}(c)$ is the echo-amplitude information, $$\text{max}amp_{x^*,y^*}(c) = \max\left(\bigcup_{z} \bigcup_{e\in c, e\ crosses\ (x^*,y^*,z)} amp(e)\right),$$

$$\text{min}amp_{x^*,y^*}(c) = \min\left(\bigcup_{z} \bigcup_{e\in c, e\ crosses\ (x^*,y^*,z)} amp(e)\right),$$

and amp(e) is the amplitude of echo e, offsetting the information in the 2D plane of each cycle in a sequence of cycles by an amount needed to match the vehicle's position at the time of the last cycle in the sequence of cycles; and aggregating the information in the 2D plane across the sequence of cycles, wherein echo-amplitude information is aggregated according to:

$$\text{aggregated\_amp\_info}_{x^*,y^*}(c_{t_i}, K) = \max_{j=i-K+1}^{i} \text{max}amp_{x^*,y^*}(\widetilde{c_{t_j}}) - \min_{j=K+1}^{i} \text{min}amp_{x^*,y^*}(\widetilde{c_{t_j}}),$$

where K is the number of cycles in the sequence of cycles, $c_{t_i}$ is the last cycle in the sequence of cycles, $\text{maxamp}_{x^*,y^*}(\widetilde{c_{t_j}})$ refers to $\text{maxamp}_{x^*,y^*}(c_{t_j})$ after accounting for the offsetting, and $\text{minamp}_{x^*,y^*}(\widetilde{c_{t_j}})$ refers to $\text{minamp}_{x^*,y^*}(c_{t_j})$ after accounting for the offsetting; and detecting objects in the field of view of the vehicle using a machine learning model trained to operate on ultrasonic sensor data including 2D cells encoding echo-intensity information, aggregated echo-amplitude information, and echo-azimuth-angle information corresponding to the field of view.

10. The method of claim 9, wherein the echo-intensity information is determined according to:

$$\text{echo\_info}_{x^*,y^*}(c) = \max_{z} numecho_{x^*,y^*,z}(c),$$

where c is a given cycle, $(x^*,y^*)$ is a coordinate of a 2D cell in the 2D plane, $\text{echo\_info}_{x^*,y^*}(c)$ is the echo-intensity information encoded in the 2D cell, and $\text{numecho}_{x^*,y^*,z}(c)$ is the number of echoes intersecting a 3D cell having a center point coordinate of $(x^*,y^*,z)$ in the point cloud representation.

11. The method of claim 10, wherein the echo-intensity information is aggregated according to:

$$\text{aggregated\_echo\_info}_{x^*,y^*}(c_{t_i}, K) = \sum\nolimits_{j=i-K+1}^{i} \max \text{echo\_info}_{x^*,y^*}(\widetilde{c_{t_j}}),$$

where K is the number of cycles in the sequence of cycles, $c_{t_i}$ is the last cycle in the sequence of cycles, $\text{echo\_info}_{x^*,y^*}(\widetilde{c_{t_j}})$ refers to the echo-intensity information $\text{echo\_info}_{x^*,y^*}(c_{t_j})$ after accounting for the offsetting.

12. The method of claim 9, wherein the echo-azimuth-angle information is determined according to:

$$\text{azi\_info}_{x^*,y^*}(c) = \max \text{max}azi_{x^*,y^*}(c) - \text{min}azi_{x^*,y^*}(c),$$

where $\text{azi\_info}_{x^*,y^*}(c)$ is the azimuth angle information, $$\text{max}azi_{x^*,y^*}(c) = \max\left(\bigcup_{z} \bigcup_{e\in c, e\ crosses\ (x^*,y^*,z)} azi(e)\right),$$

$$\text{min}azi_{x^*,y^*}(c) = \min\left(\bigcup_{z} \bigcup_{e\in c, e\ crosses\ (x^*,y^*,z)} azi(e)\right),$$

and azi(e) is the azimuth angle of echo e.

13. The method of claim 12, wherein the echo-azimuth-angle information is aggregated according to:

$$\text{aggregated\_azi\_info}_{x^*,y^*}(c_{t_i}, K) = \max_{j=i-K+1}^{i} \text{max}azi_{x^*,y^*}(\widetilde{c_{t_j}}) - \min_{j=K+1}^{i} \text{min}azi_{x^*,y^*}(\widetilde{c_{t_j}}),$$

where K is the number of cycles in the sequence of cycles, $c_{t_i}$ is the last cycle in the sequence of cycles, $\text{maxazi}_{x^*,y^*}(\widetilde{c_{t_j}})$ refers to $\text{maxazi}_{x^*,y^*}(c_{t_j})$ after accounting for the offsetting, and $\text{minazi}_{x^*,y^*}(\widetilde{c_{t_j}})$ refers to $\text{minazi}_{x^*,y^*}(c_{t_j})$ after accounting for the offsetting.

14. The method of claim 9, further comprising:

normalizing the aggregated information of each 2D cell within a field of view.

15. The method of claim 14, further comprising: matching the normalized information of each 2D cell with ground truth values to generate training data for a machine-learning model.

16. The method of claim 14, further comprising: inputting the normalized 2D plane values into a trained machine-learning model to generate a plurality of bounding boxes and confidence scores, wherein each bounding box is paired with a confidence score that quantifies the likelihood of the bounding box containing an object.

17. A method for detecting objects in a field of view of a vehicle, the method comprising:

during each of a plurality of cycles, simultaneously emitting, according to a fixed pattern, an ultrasonic signal from one or more of a plurality of ultrasonic sensors embedded on a moving vehicle, wherein each emitted ultrasonic signal is received as an echo at one of the plurality of ultrasonic sensors;

obtaining echo data corresponding to the received echoes, the echo data including, for each received echo, the sending sensor, the receiving sensor, a travel distance, and an amplitude;

for each cycle, generating a three-dimensional ("3D"), point cloud representation of the generated echo data, the point cloud representation comprising 3D cells with each 3D cell including a center point of the 3D cell, the number of echoes intersecting the 3D cell, and for each intersecting echo, an amplitude of the intersecting echo and an azimuth angle of the intersecting echo;

for each cycle, projecting the 3D representation onto a two-dimensional ("2D") plane comprising 2D cells, each 2D cell corresponding to a plurality of 3D cells of the point cloud representation, and each 2D cell encoding echo-intensity information, echo-amplitude information, and echo-azimuth-angle information derived from the corresponding one or more 3D cells, wherein the echo-azimuth-angle information is determined according to:

$$\text{azi\_info}_{x^*,y^*}(c) = \max \text{max}azi_{x^*,y^*}(c) - \text{min}azi_{x^*,y^*}(c),$$

where $\text{azi\_info}_{x^*,y^*}(c)$ is the azimuth angle information, $$\text{max}azi_{x^*,y^*}(c) = \max\left(\bigcup_{z} \bigcup_{e \in c, e\ crosses\ (x^*,y^*,z)} azi(e)\right),$$

$$\text{min}azi_{x^*,y^*}(c) = \min\left(\bigcup_{z} \bigcup_{e \in c, e\ crosses\ (x^*,y^*,z)} azi(e)\right),$$

and azi(e) is the azimuth angle of echo e, offsetting the information in the 2D plane of each cycle in a sequence of cycles by an amount needed to match the vehicle's position at the time of the last cycle in the sequence of cycles; and aggregating the information in the 2D plane across the sequence of cycles, wherein the echo-azimuth-angle information is aggregated according to:

$$\text{aggregated\_azi\_info}_{x^*,y^*}(c_{t_i}, K) = \max\nolimits_{j=i-K+1}^{i} \text{max}azi_{x^*,y^*}(\widetilde{c_{t_j}}) - \min\nolimits_{j=K+1}^{i} \text{min}azi_{x^*,y^*}(\widetilde{c_{t_j}}),$$

where K is the number of cycles in the sequence of cycles, $c_{t_i}$ is the last cycle in the sequence of cycles, $\text{maxazi}_{x^*,y^*}(\widetilde{c_{t_j}})$ refers to $\text{maxazi}_{x^*,y^*}(c_{t_j})$ after accounting for the offsetting, and $\text{minazi}_{x^*,y^*}(\widetilde{c_{t_j}})$ refers to $\text{minazi}_{x^*,y^*}(c_{t_j})$ after accounting for the offsetting; and detecting objects in the field of view of the vehicle using a machine learning model trained to operate on ultrasonic sensor echo data including 2D cells encoding aggregated echo-intensity information, echo-amplitude information, and aggregated echo-azimuth-angle information corresponding to the field of view.

18. The method of claim 17, wherein the echo-intensity information is determined according to:

$$\text{echo\_info}_{x^*,y^*}(c) = \max_{z} numecho_{x^*,y^*,z}(c),$$

where c is a given cycle, (x*,y*) is a coordinate of a 2D cell in the 2D plane, $\text{echo\_info}_{x^*,y^*}(c)$ is the echo-intensity information encoded in the 2D cell, and $\text{numecho}_{x^*,y^*,z}(c)$ is the number of echoes intersecting a 3D cell having a center point coordinate of (x*,y*,z) in the point cloud representation.

19. The method of claim 18, wherein the echo-intensity information is aggregated according to:

$$\text{aggregated\_echo\_info}_{x^*,y^*}(c_{t_i}, K) = \sum\nolimits_{j=i-K+1}^{i} \max \text{echo\_info}_{x^*,y^*}(\widetilde{c_{t_j}}),$$

where K is the number of cycles in the sequence of cycles, $c_{t_i}$ is the last cycle in the sequence of cycles, $\text{echo\_info}_{x^*,y^*}(\widetilde{c_{t_j}})$ refers to the echo-intensity information $\text{echo\_info}_{x^*,y^*}(c_{t_j})$ after accounting for the offsetting.

20. The method of claim 17, wherein the echo-amplitude information is determined according to:

$$\text{amp\_info}_{x^*,y^*}(c) = \max \text{max}amp_{x^*,y^*}(c) - \text{min}amp_{x^*,y^*}(c),$$

where C is a given cycle, (x*,y*) is a coordinate of a 2D cell in the 2D plane, $\text{amp\_info}_{x^*,y^*}(c)$ is the echo-amplitude information, $$\text{max}amp_{x^*,y^*}(c) = \max\left(\bigcup_{z} \bigcup_{e \in c, e\ crosses\ (x^*,y^*,z)} amp(e)\right),$$

$$\text{min}amp_{x^*,y^*}(c) = \min\left(\bigcup_{z} \bigcup_{e \in c, e\ crosses\ (x^*,y^*,z)} amp(e)\right),$$

and amp(e) is the amplitude of echo e.

* * * * *